(12) United States Patent
Kassai et al.

(10) Patent No.: US 7,445,230 B2
(45) Date of Patent: Nov. 4, 2008

(54) BABY CARRIAGE

(75) Inventors: Kenzou Kassai, Osaka (JP); Hiroyasu Yamamoto, Daito (JP); Koichi Yokoyama, Uda-gun (JP)

(73) Assignee: Aprica Kassai Kabushikikaisha, Osaka-shi (JP)

( * ) Notice: Subject to any disclaimer, the term of this patent is extended or adjusted under 35 U.S.C. 154(b) by 661 days.

(21) Appl. No.: 10/492,680

(22) PCT Filed: May 2, 2003

(86) PCT No.: PCT/JP03/05636

§ 371 (c)(1),
(2), (4) Date: Sep. 17, 2004

(87) PCT Pub. No.: WO03/104060

PCT Pub. Date: Dec. 18, 2003

(65) Prior Publication Data

US 2005/0017481 A1    Jan. 27, 2005

(30) Foreign Application Priority Data

Jun. 5, 2002    (JP)    ............................ 2002-164465

(51) Int. Cl.
*B62B 7/08*    (2006.01)
(52) U.S. Cl. ...................... 280/644; 280/650
(58) Field of Classification Search .......... 280/47.38, 280/47.4, 641, 642, 644, 647, 650, 658, 33.993; 297/452.12, 452.14, 452.15
See application file for complete search history.

(56) References Cited

U.S. PATENT DOCUMENTS

| | | | | |
|---|---|---|---|---|
| 4,159,146 A | * | 6/1979 | Braconnier et al. .... | 297/452.15 |
| 4,265,466 A | * | 5/1981 | Kassai ......................... | 280/648 |
| 4,335,893 A | | 6/1982 | Carmichael et al. | |
| 4,655,502 A | * | 4/1987 | Houllis ....................... | 297/229 |
| 4,741,056 A | * | 5/1988 | Kassai ......................... | 5/99.1 |
| 4,741,551 A | * | 5/1988 | Perego ........................ | 280/642 |
| 5,340,197 A | * | 8/1994 | Vogtherr ................ | 297/452.12 |
| 5,375,869 A | * | 12/1994 | Hsiao ......................... | 280/648 |
| 5,641,200 A | | 6/1997 | Howell ................... | 297/256.17 |
| 5,669,623 A | * | 9/1997 | Onishi ....................... | 280/642 |
| 5,752,738 A | | 5/1998 | Onishi et al. | |
| 6,443,480 B1 | * | 9/2002 | Wu ............................ | 280/649 |

FOREIGN PATENT DOCUMENTS

| | | |
|---|---|---|
| EP | 0 677 262 | 10/1995 |
| EP | 0 695 527 | 2/1996 |

(Continued)

*Primary Examiner*—Frank B Vanaman
(74) *Attorney, Agent, or Firm*—W. F. Fasse; W. G. Fasse (57) ABSTRACT

A baby carriage folded so as to be reduced in dimension in the width direction comprises a body frame (10) and a seat hammock (20). The body frame includes a seating surface supporting member (11) and a pair of side vertical frame members (12). The seat hammock includes a seating surface sheet part (21) and a backrest sheet part (22). The seating surface sheet part (21) includes a seating surface core (53) and the backrest sheet part (22) includes a back surface core (52). The seating surface core (53) and the back surface core (52) are constituted by a core continuously extending from the seating surface sheet part (21) to the backrest sheet part (22).

8 Claims, 14 Drawing Sheets

| | FOREIGN PATENT DOCUMENTS | | | | |
|----|----|----|----|----|----|
| EP | 0 697 323 | 2/1996 | JP | 3-33546 | 5/1991 |
| FR | 2 462 323 | 2/1981 | JP | 07-329789 | 12/1995 |
| GB | 2 089 292 | 6/1982 | JP | 8-58599 | 3/1996 |
| JP | 61-158568 | 10/1986 | JP | 8-99638 | 4/1996 |
| | | | JP | 08-175395 | 7/1996 |

* cited by examiner

BABY CARRIAGE

TECHNICAL FIELD

The present invention relates to a baby carriage comprising a seat hammock and more particularly, it relates to a baby carriage having a core in each of a seat part and a backrest part of the seat hammock.

BACKGROUND ART

Japanese Unexamined Utility Model Publication No. 7-4248 discloses a lightweight type of baby carriage in which a seat hammock is mounted on a body frame. The baby carriage disclosed in the above document is folded so as to shrink in the width direction. A backrest sheet part of the hammock is supported by a belt member from behind and a reclined angle of the backrest sheet part can be varied by adjusting a length of the belt. According to this kind of baby carriage, a reclining structure of the backrest part is very simple and its weight can be reduced.

In general, the seat hammock has a core in each of a seating surface sheet part and the backrest sheet part. In the conventional lightweight type of baby carriage folded so as to shrink in the width direction, a seating surface core and a back surface core are separated so as not to hinder a folding operation. In addition, width dimensions of the seating surface core and the back surface core are considerably reduced so that the body frame can easily shrink in the width direction. In another case, the respective seating surface core and back surface core are constituted so as to be bent in the shape of wedge in the width direction so that the seating surface core and the back surface core can reduce their width dimensions together with the body frame.

When a child is seated in the seat of the baby carriage, a waist part of the child is held by a crotch belt and a waist belt provided in the baby carriage. Therefore, a movement of the seating surface sheet part supporting buttocks of the child from beneath can be restrained. Meanwhile, the backrest sheet part is connected to the seating surface sheet part by a cloth of the hammock only. Besides, since the width dimension of the back surface core is smaller than the width dimension of the backrest sheet part in general, the backrest sheet part is swayed from side to side by oscillations generated in accordance with movements of the baby carriage. Because of such lateral sway of the backrest sheet part, the child feels uncomfortable and a parent feels uneasy.

DISCLOSURE OF INVENTION

It is an object of the present invention to provide a baby carriage which can prevent lateral sway of a backrest sheet part.

According to the present invention, a baby carriage folded so as to be reduced in dimension in the width direction comprises a body frame and a seat hammock. The body frame includes a seating surface supporting member, and a pair of side vertical frame members extending to rise upward from both sides of a rear end region of the seating surface supporting member. The seat hammock includes a seating surface sheet part extending over the seating surface supporting member, and a backrest sheet part connected to a rear edge of the seating surface sheet part and extending between the pair of side vertical frame members. The seating surface sheet part includes a seating surface core, and the backrest sheet part includes a back surface core. The seating surface core and the back surface core are constituted by a core continuously extending from the seating surface sheet part to the backrest sheet part.

According to the above constitution, since the back surface core and the seating surface core are formed of the continuous core, the lateral sway of the backrest sheet part including the back surface core can be prevented as much as possible.

The effect of preventing the lateral sway can be further enhanced when the width dimension of the back surface core is increased. In other words, the back surface core preferably ranges over the whole width dimension of the backrest sheet part. In this case, the back surface core is a sheet of plate-shaped member extending over the whole length of the backrest sheet part in the width direction, for example.

More preferably, the width dimension of the back surface core is larger than a distance between the pair of side vertical frame members in a folded state of the baby carriage, and the backrest sheet part including the back surface core is positioned behind the pair of side vertical frame members in the folded state of the baby carriage. The back surface core has a tapered configuration in which the width is increased toward the upper side.

The seating surface core and the back surface core are preferably a sheet of flat plate having a concave portion at a bending point thereof. According to one embodiment, the concave portion is a notch formed in a back surface of the flat plate. The part at the bending point may be thinned instead of being notched. Preferably, the concave portions are provided at a plurality of positions at intervals in the longitudinal direction of the core in order to connect the seating surface core and the back surface core to be smoothly curved. Thus, the buttocks of the child can be stably supported in a large space.

According to a preferable embodiment, the core includes a hard resin plate and a cushion attached thereon. A hinge for connecting the seating surface core and the back surface core to be bent is formed by a thinned part of the resin plate constituting the concave portion.

In order to reduce the weight of the baby carriage, the baby carriage has a structure in which the backrest sheet part is supported from behind by a string member, for example. The back surface string member extends over the whole length of the back surface of the backrest sheet part in the width direction and has both ends connected to the pair of side vertical frame members. Although in this lightweight type of baby carriage, the lateral sway of the backrest sheet part especially was large, when the seating surface core and the back surface core are formed of a sheet of continuously extending core, the lateral sway can be reduced.

According to one embodiment, the backrest sheet part includes a head part core connected to an upper edge of the back surface core. The head part core is preferably connected to the back surface core so as to be allowed to be bent. The head part core and the back surface core may be constituted by a sheet of plate. Alternatively, they may be formed of different members and connected by a hinge.

BEST MODE FOR CARRYING OUT THE INVENTION

One embodiment of the present invention is described with reference to the drawings.

Figure 1:
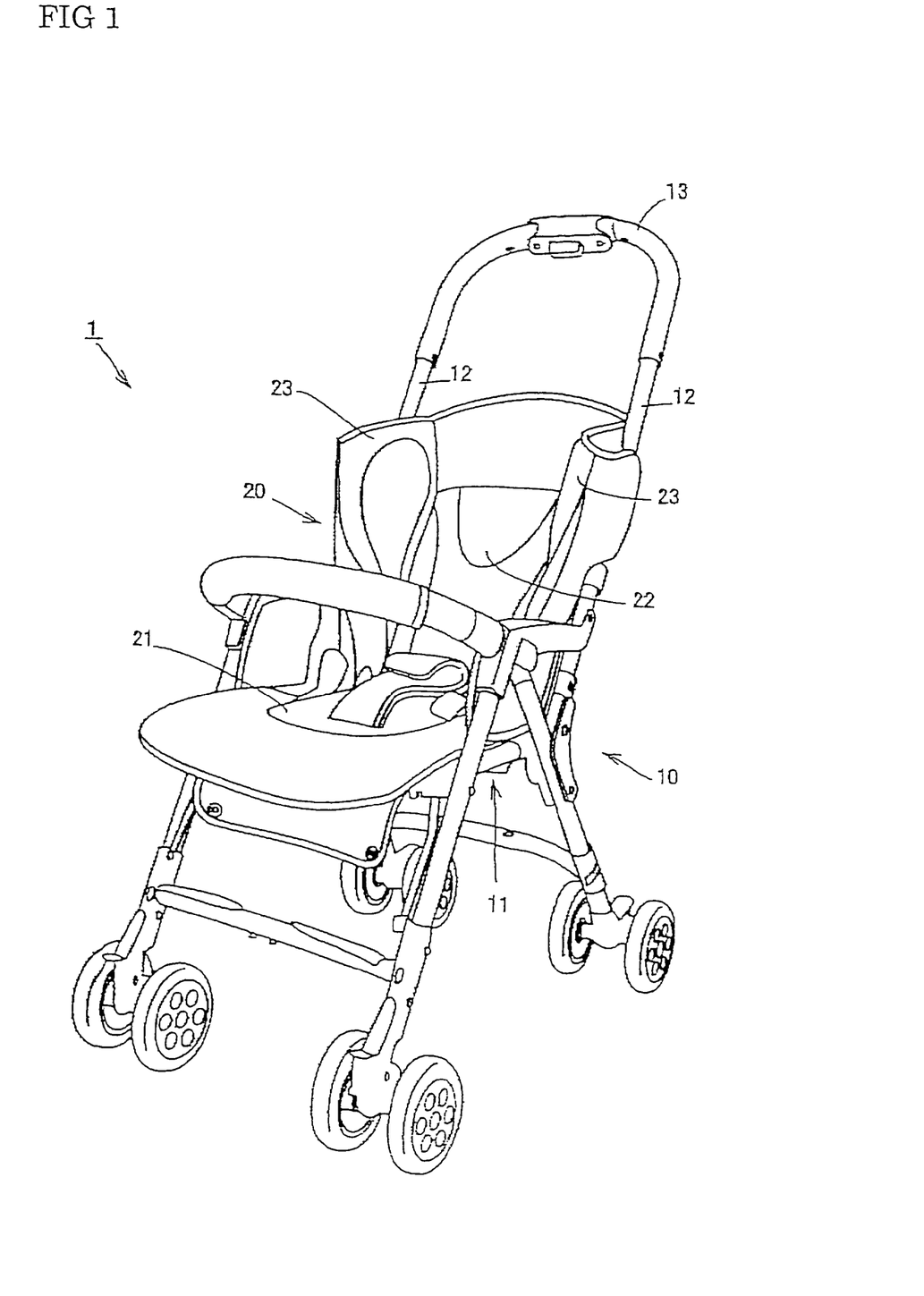
FIG. 1 is a perspective view showing a baby carriage from the front side according to one embodiment of the present invention.
Figure 2:
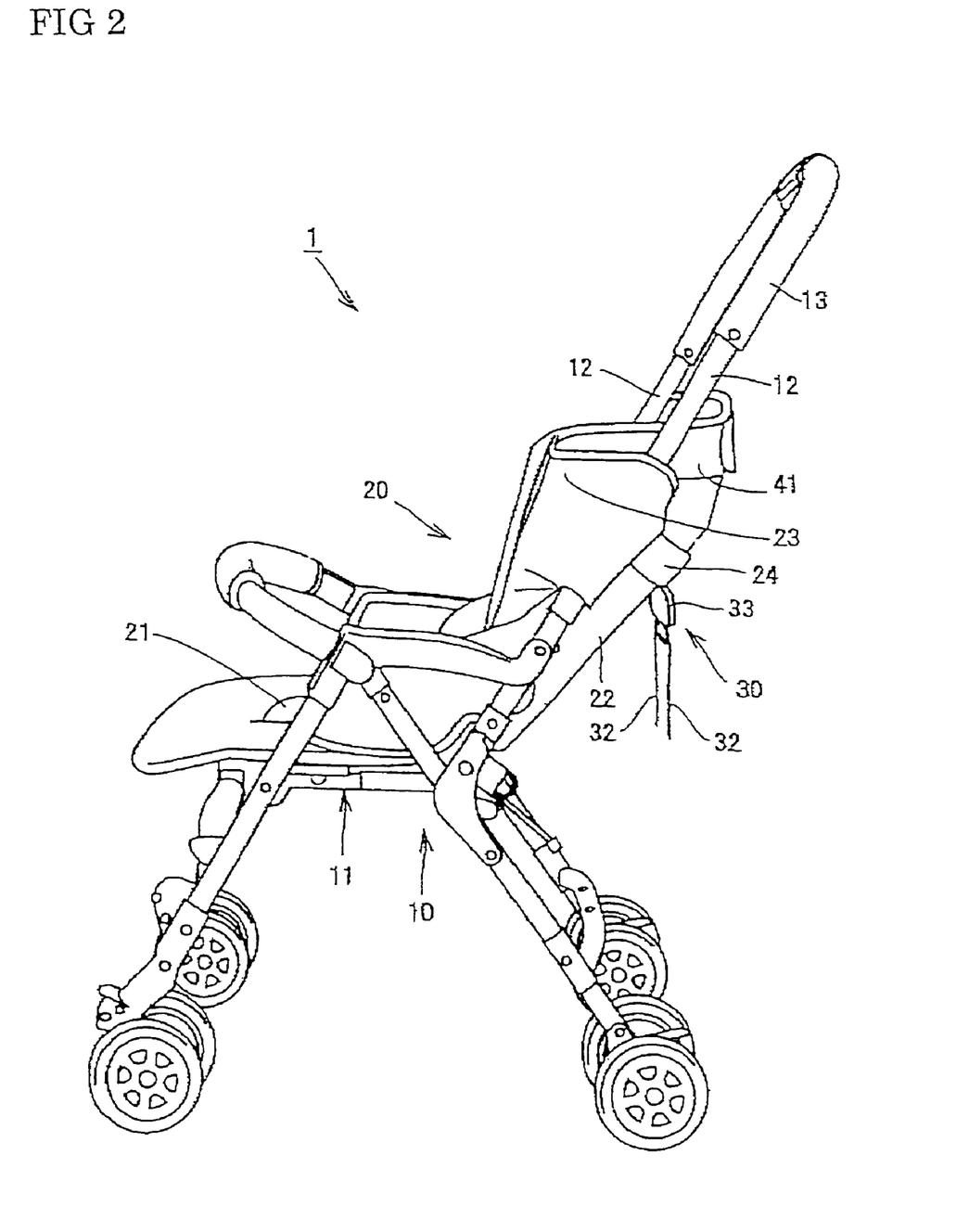
FIG. 2 is a side view showing the baby carriage.
Figure 3:
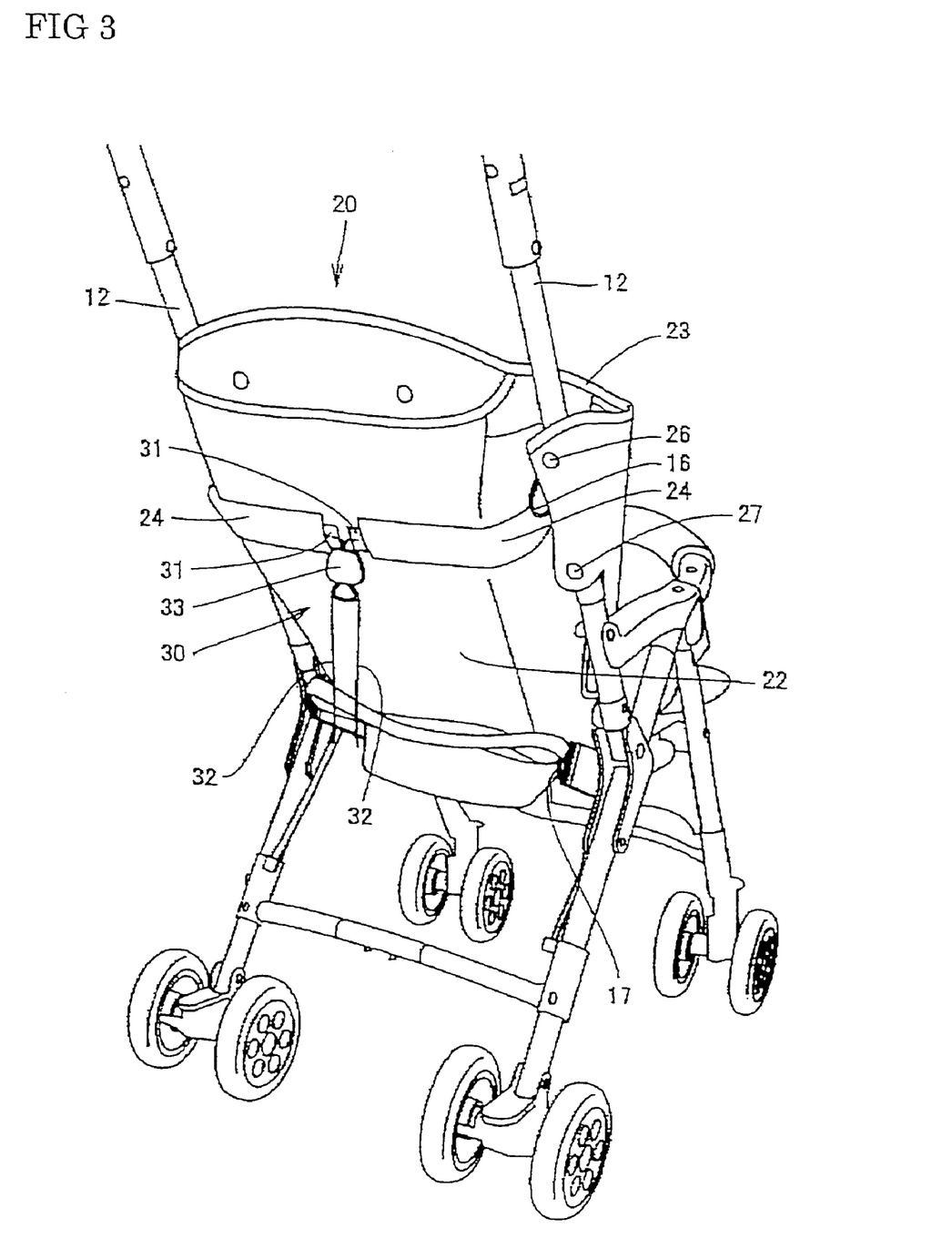
FIG. 3 is a perspective view showing the baby carriage from the back side.
Figure 4:
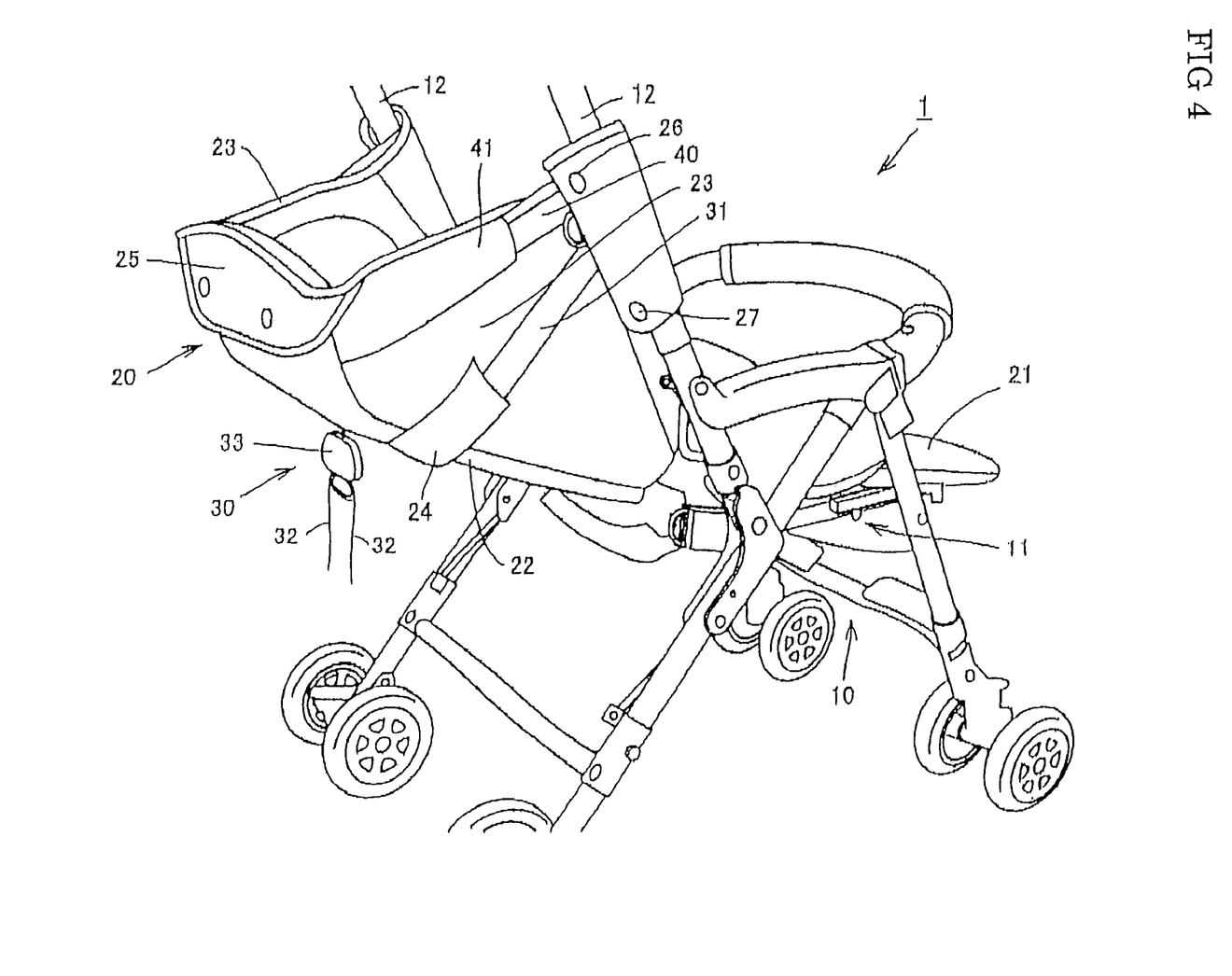
FIG. 4 is a perspective view showing the baby carriage in which a backrest sheet part is reclined to become in the form of a bed.
Figure 5:
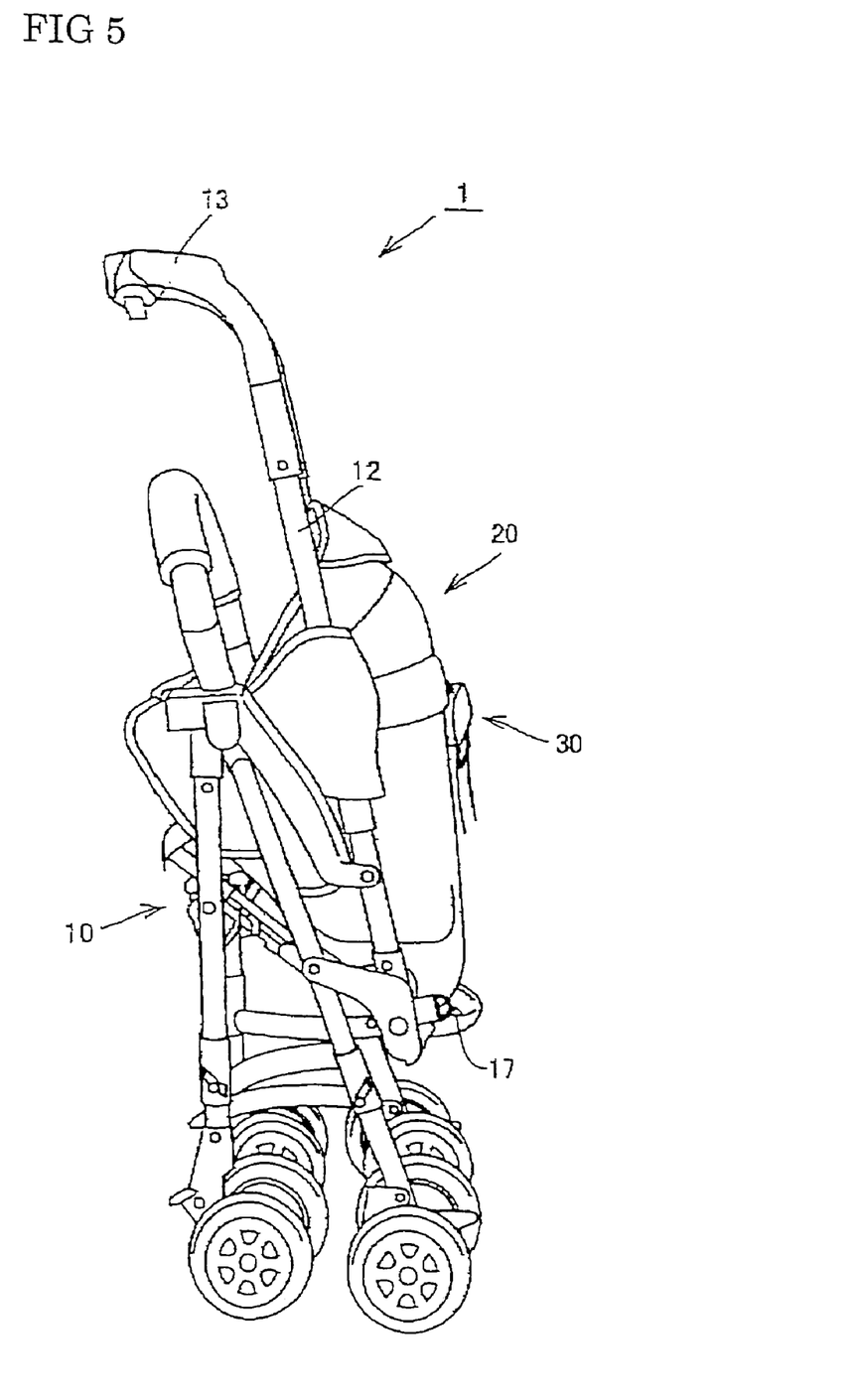
FIG. 5 is a side view showing the baby carriage in a folded state in which the baby carriage has been reduced in size in the width direction.

An illustrated baby carriage 1 can take the form of a chair shown in FIGS. 1 to 3 and the form of a bed shown in FIG. 4 in a state ready for use. In addition, as shown in FIG. 5, the baby carriage 1 is reduced in dimension in the width direction and stands by itself in a folded state. Since a mechanism for folding the baby carriage by reducing a dimension in the width direction is well known in this field, detailed illustration and description thereof are omitted.

As shown in FIGS. 1 to 3, the baby carriage 1 comprises a body frame 10 constituting a body and a seat hammock 20 mounted thereon. The body frame 10 includes a seating surface supporting member 11 supporting a seating surface, and a pair of side vertical frame members 12 extending to rise upward from both sides of a rear end of the seating surface supporting member 11. Upper ends of the pair of side vertical frame members 12 are connected by an inverted U-shaped connection member 13. The pair of side vertical frame members 12 and the inverted U-shaped connection member 13 constitute a push bar for moving the baby carriage.

The seat hammock 20 includes a seating surface sheet part 21 extending over the seating surface supporting member 11 of the body frame, a backrest sheet part 22 connected to a rear edge of the seating surface sheet part 21 and a pair of side surface sheet parts 23 rising from both side edges of the backrest sheet part 22 and protruding forward.

Figure 10:
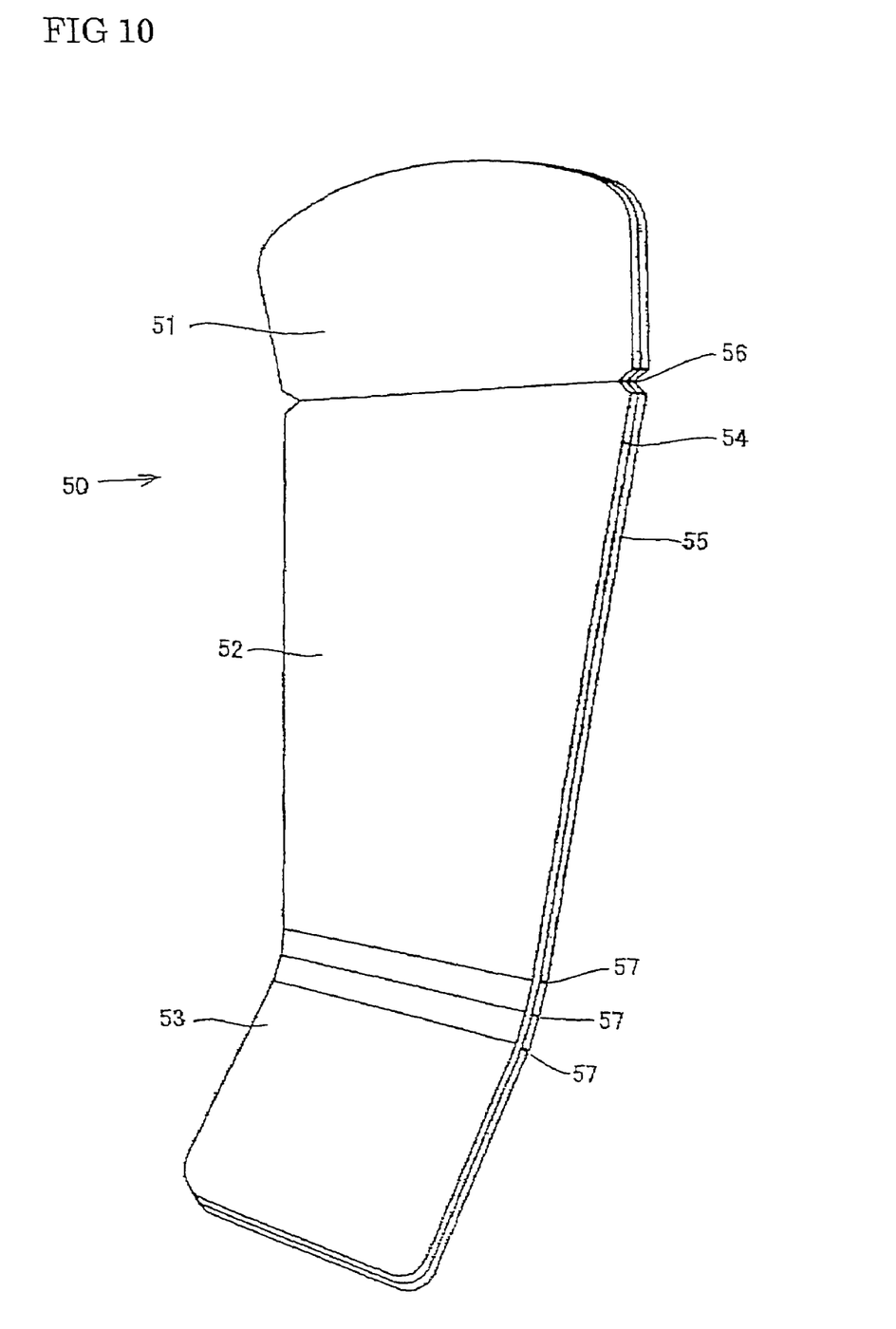
FIG. 10 is a perspective view showing a core.

A core 50 in the form of a sheet of flat plate shown in FIG. 10 is contained in the backrest sheet part 22 and the seating surface sheet part 21 of the seat hammock 20. The core 50 includes a hard resin plate 55 and a cushion 54 attached thereon. The core 50 is divided into three regions, that is, a head part core 51, a back surface core 52 and a seating surface core 53.

Figure 11:
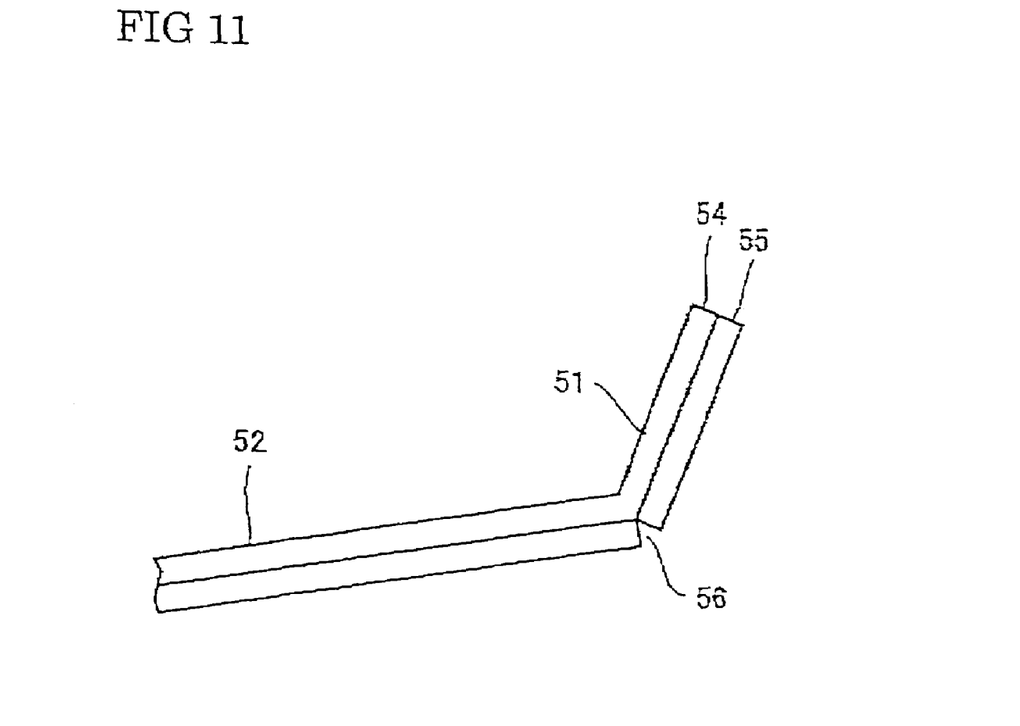
FIG. 11 is a side view showing a connection part between a head part core and a back surface core.

As shown in FIG. 11, the head part core 51 and the back surface core 52 are connected to be allowed to be bent by a notch 56 provided in the resin plate 55 on the back surface side. A hinge for connecting them to be bent is formed of a thinned part of the resin plate 55 formed by being notched. In a state shown in FIG. 11, the head part core 51 rises from the back surface core 52. From this state, when the head part core 51 is turned clockwise to be in the same plane with the back surface core 52, since an end face of the resin plate of the head part core 51 abuts on an end face of the resin plate of the back surface core 52, the same plane state of them is stably maintained.

Figure 12:
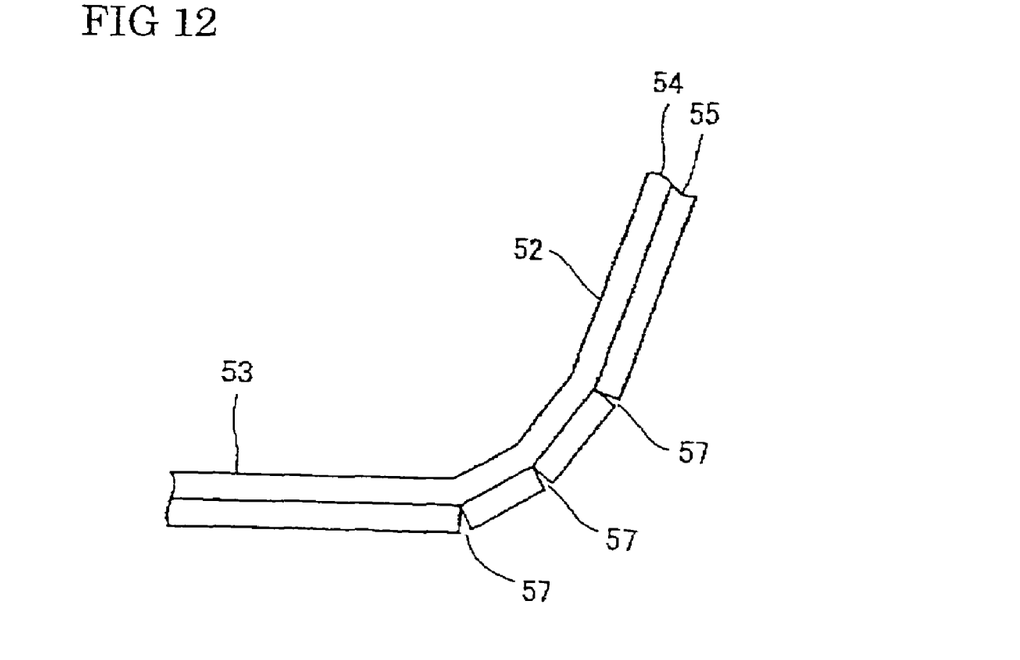
FIG. 12 is a side view showing a connection part between the back surface core and a seating surface core.

As shown in FIG. 12, the back surface core 52 and the seating surface core 53 are connected to be smoothly bent by three notches 57 provided in the resin plate 55 on the back surface side. Hinges for connecting them to be bent are formed by thinned parts of the resin plate 55 formed by being notched. Since three notches 57 are provided, the back surface core 52 and the seating surface core 53 can be connected so as to be smoothly curved. As a result, buttocks of a child seated can be stably supported in a large space.

Figure 15:
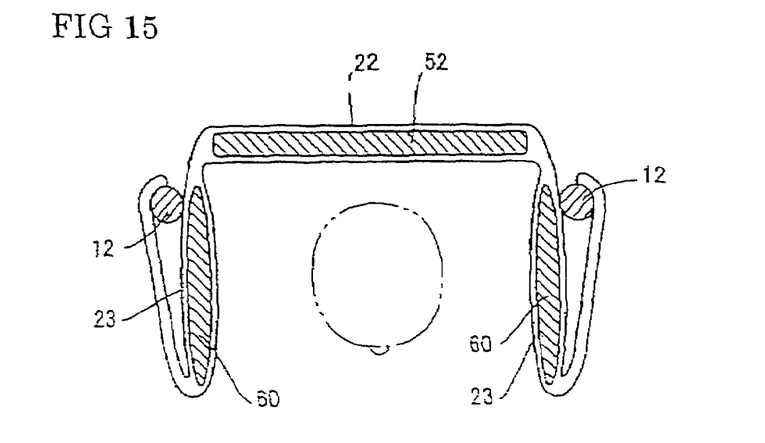
FIG. 15 is a sectional view showing a seat part of the baby carriage in the form of a chair from the upper side.

As shown in FIG. 10, the back surface core 52 and the head part core 51 are tapered so as to become wide toward the upper side. As shown in FIG. 15, the maximum width dimensions of the back surface core 52 and the head part core 51 preferably range over the whole width dimension of the backrest sheet part 22.

When the back surface core 52 and the head part core 51 are made to have the wide width dimensions and the seating surface core 53 and the back surface core 52 are constituted by a sheet of core, even in the illustrated lightweight type of baby carriage 1, the posture of the backrest sheet part 22 can be stably maintained.

According to the conventional lightweight type of baby carriage folded so as to shrink in the width direction, the seating surface core and the back surface core are separated and width dimension of the core is further reduced so that the folding operation may not be hindered. When the child is seated in the seat, since the child is held by a crotch belt and a waist belt, a movement of the seating surface sheet part is restrained. In the meantime, since the backrest sheet part is connected to the seating surface sheet part by a cloth of the hammock only and a width dimension of the back surface core is small, the backrest sheet part is swayed from side to side by oscillations generated in accordance with movements of the baby carriage.

Meanwhile, according to the illustrated baby carriage 1, since especially the back surface core 52 and the seating surface core 53 are formed of one common core, the lateral sway of the backrest sheet part 22 can be restrained as much as possible. This effect can be further enhanced when the width dimension of the back surface core 52 is increased and the back surface core 52 ranges over the whole width dimension of the backrest sheet part 22.

Figure 16:
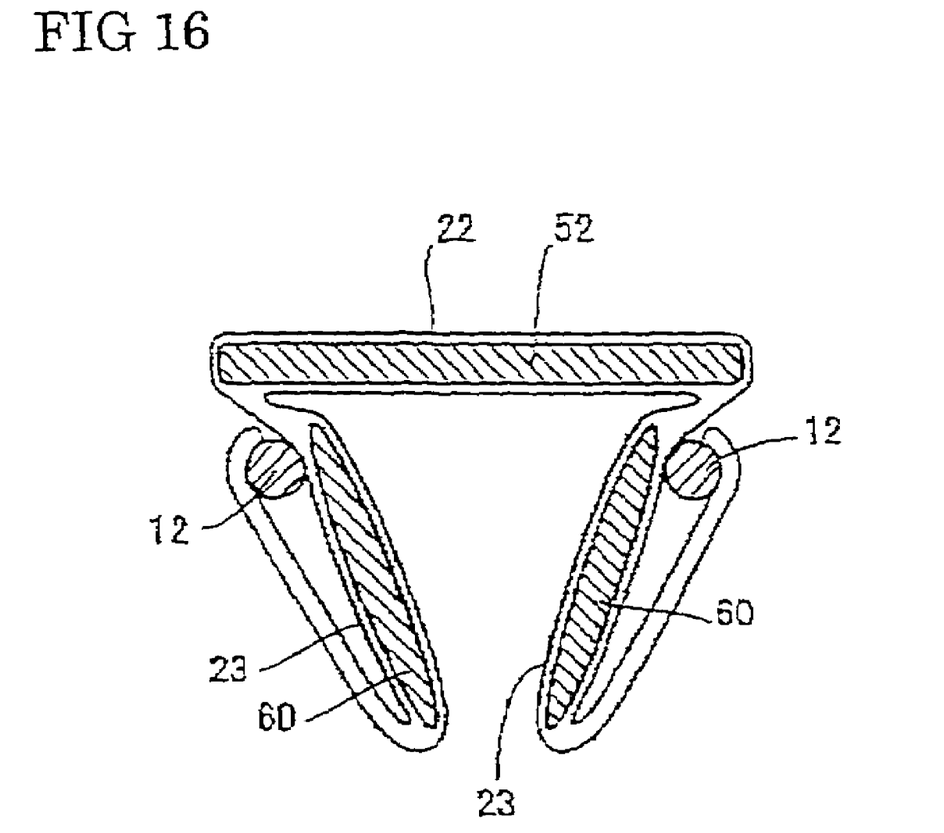
FIG. 16 is a sectional view showing a seat part of the folded baby carriage from the upper side.

FIG. 15 shows a used state of the baby carriage 1 and FIG. 16 shows a folded state of the baby carriage 1. As can be clear from comparison between FIGS. 15 and 16, in the folded state of the baby carriage, a distance between the pair of side vertical frame members 12 is reduced. In the used state shown in FIG. 15, the back surface core 52 ranges over the whole width dimension of the backrest sheet part 22. In the folded state shown in FIG. 16, the backrest sheet part 22 including the back surface core 52 is not bent in the width direction especially, and positioned behind the pair of side vertical frame members 12. In such folded structure, even when the width dimension of the back surface core 52 is increased, the folding operation of the baby carriage shrinking in the width direction is not hindered.

As shown in FIG. 15, the pair of side surface sheet parts 23 includes protection pads 60 at positions corresponding to a height of a head of the child seated. In the form of the chair shown in FIGS. 1 and 15, the pair of the side surface sheet parts 23 including the protection pads 60 protrudes forward of the pair of side vertical frame members 12. Meanwhile, in the form of the bed shown in FIG. 4, the side surface sheet parts 23 including the protection pads are positioned backward of the pair of side vertical frame members 12. Thus, according to the illustrated baby carriage 1, the head of the child can be protected from impact from the side in both chair state and bed state.

Next, a description is made of a mechanism for changing the baby carriage from the form of the chair state shown in FIGS. 1 to 3 to the form of the bed state shown in FIG. 4.

As can be clearly shown in FIG. 3, the baby carriage 1 includes a back surface support 30 connected to the body frame 10 in such a manner that the backrest part 22 can be reclined and supported from behind. The back surface support 30 is described in detail with reference to FIGS. 3, 13 and 14.

Figure 14:
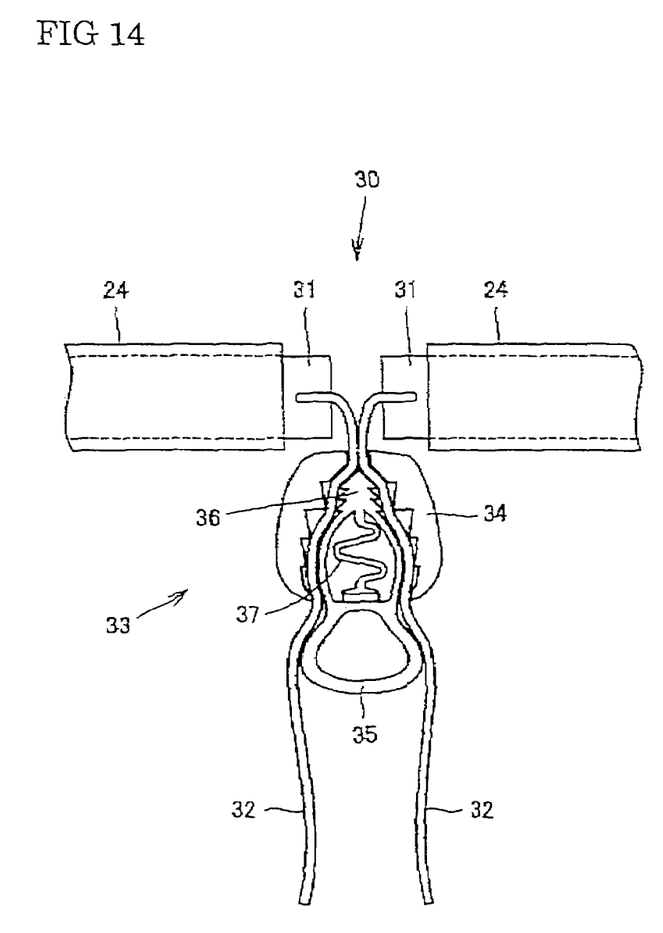
FIG. 14 is a view showing a back surface support in which a lock member is shown in section.

The back surface support 30 includes a back surface string member extending over the whole length of the back surface of the backrest sheet part 22 in the width direction and having both ends connected to the pair of side vertical frames 12. The back surface string member is constituted by right and left belts 31, right and left strings 32 and a lock member 33. The right and left belts 31 each have one end connected to the pair of side vertical frame members 12. A pair of guide sleeves 24 for passing the right and left belts 31 are sewed on the back surface of the backrest sheet part 22 of the hammock. As shown in FIG. 14, the right and left strings 32 are connected to the other ends of the right and left belts 31 passing through the guide sleeves 24.

The right and left strings 32 pass through the lock member 33. The lock member 33 comprises a case 34, a grip 35 movable up and down, a click 36 positioned at an upper end of the grip 35 and a spring 37 forcing the grip 35 to move upward. When a load is applied to the backrest sheet part 22 backward, the right and left belts 31 are forced to be separated. However, since the click 36 and the case 34 of the lock member 33 engage with the right and left strings 32, the right and left strings 32 are prevented from being moved upward. Thus, the posture of the backrest sheet part 22 can be stably maintained by the back surface support 30.

When the baby carriage is to be changed from the form of the chair to the form of the bed shown in FIG. 4, the grip 35 of the lock member 33 is just pulled down by a finger. Since the engagement of the click 36 with the right and left strings 32 can be released by pulling down the grip 35, the backrest sheet part 22 can be easily reclined. When the backrest sheet part 22 is positioned at a desired angle, the click 36 forced by the spring 37 engages with the right and left strings 32 by releasing the grip 35 from the finger, so that the position of the backrest sheet part 22 can be fixed.

As shown in FIG. 4, when the backrest sheet part 22 is reclined to be the form of the bed, an upper end region 25 of the backrest sheet part 22 is bent from the remaining backrest sheet part to protect a top of the head of the child. Such change in form is attained by providing an upper end connection member 40 connecting an upper end of the backrest sheet part 22 to the side vertical frame members 12.

Figure 13:
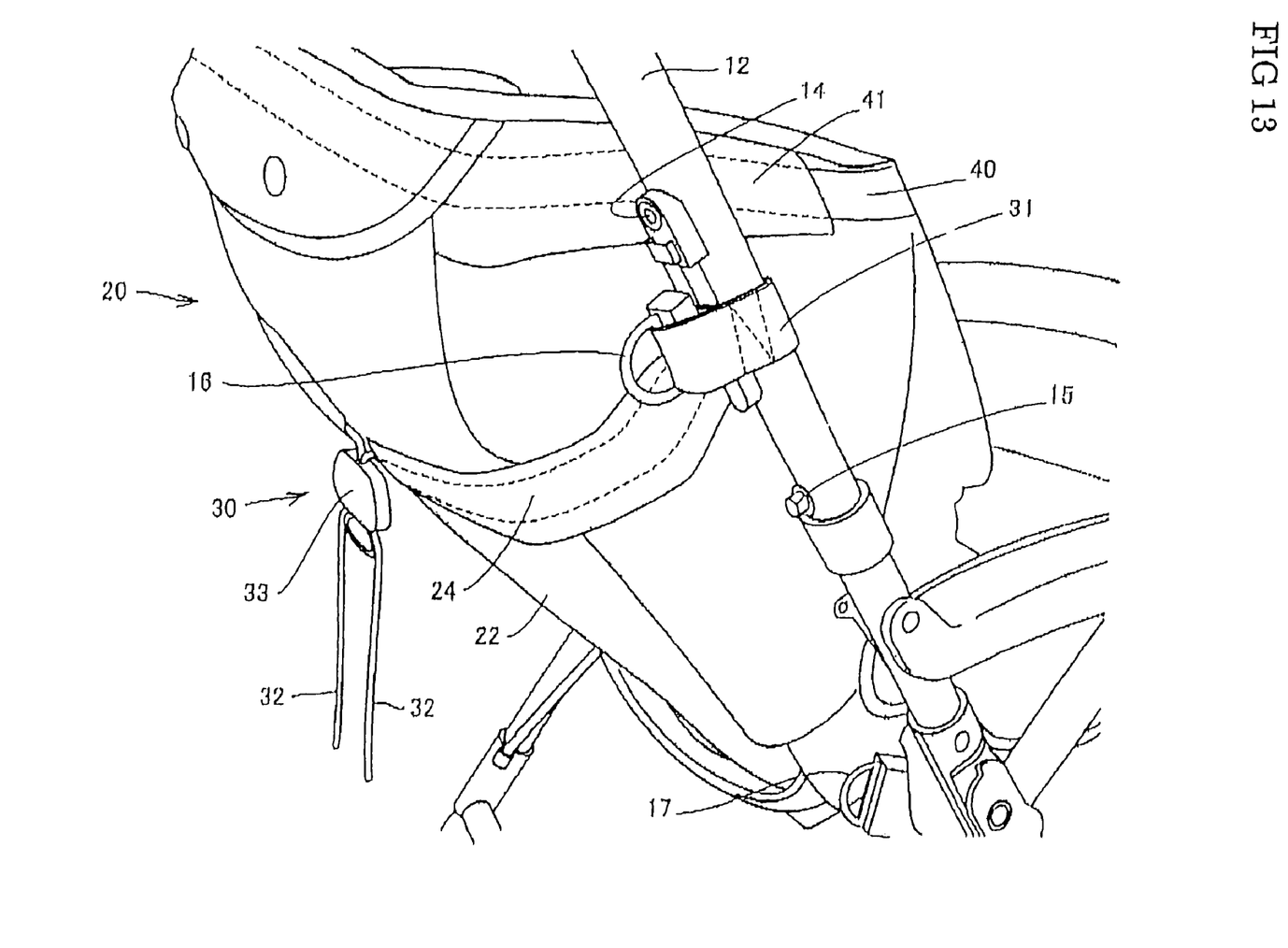
FIG. 13 is a perspective view showing lateral and back sides of the baby carriage in detail.

As can be clear from FIGS. 4 and 13, the upper end connection member 40 in the form of a band or a strip is provided at the upper end of the seat hammock 20. The upper end connection member 40 passes through a guide sleeve 41 sewed on the upper end of the seat hammock 20. The pair of side surface sheet parts 23 of the seat hammock 20 is wound around the pair of side vertical frame member 12 to be fixed. More specifically, a male button 26 and a female button 27 which are mounted on the side surface sheet part 23 engage with a female button 14 and a male button 15 mounted on the side vertical frame member, respectively.

It is necessary to appropriately select a length of the upper end connection member 40 so that the following operation can be performed. That is, as shown in FIG. 3, the upper end connection member 40 is in a loose state in which there is no load applied until a reclined angle of the backrest sheet part 22 reaches a predetermined value. Meanwhile, when the reclined angle of the backrest sheet part 22 reaches the predetermined value, the upper end connection member 40 becomes tense and the position of the upper end of the backrest sheet part 22 is fixed. Therefore, when the backrest sheet part 22 is further reclined beyond the predetermined angle, the upper end region 25 of the backrest sheet part 22 is bent from the remaining backrest sheet part so as to have a configuration which covers the top of the head of the child as shown in FIG. 4.

The illustrated baby carriage 1 has a structure in which the baby carriage can be easily carried in the folded state. This is described with reference to FIGS. 6 to 9 and FIG. 13.

Figure 7:
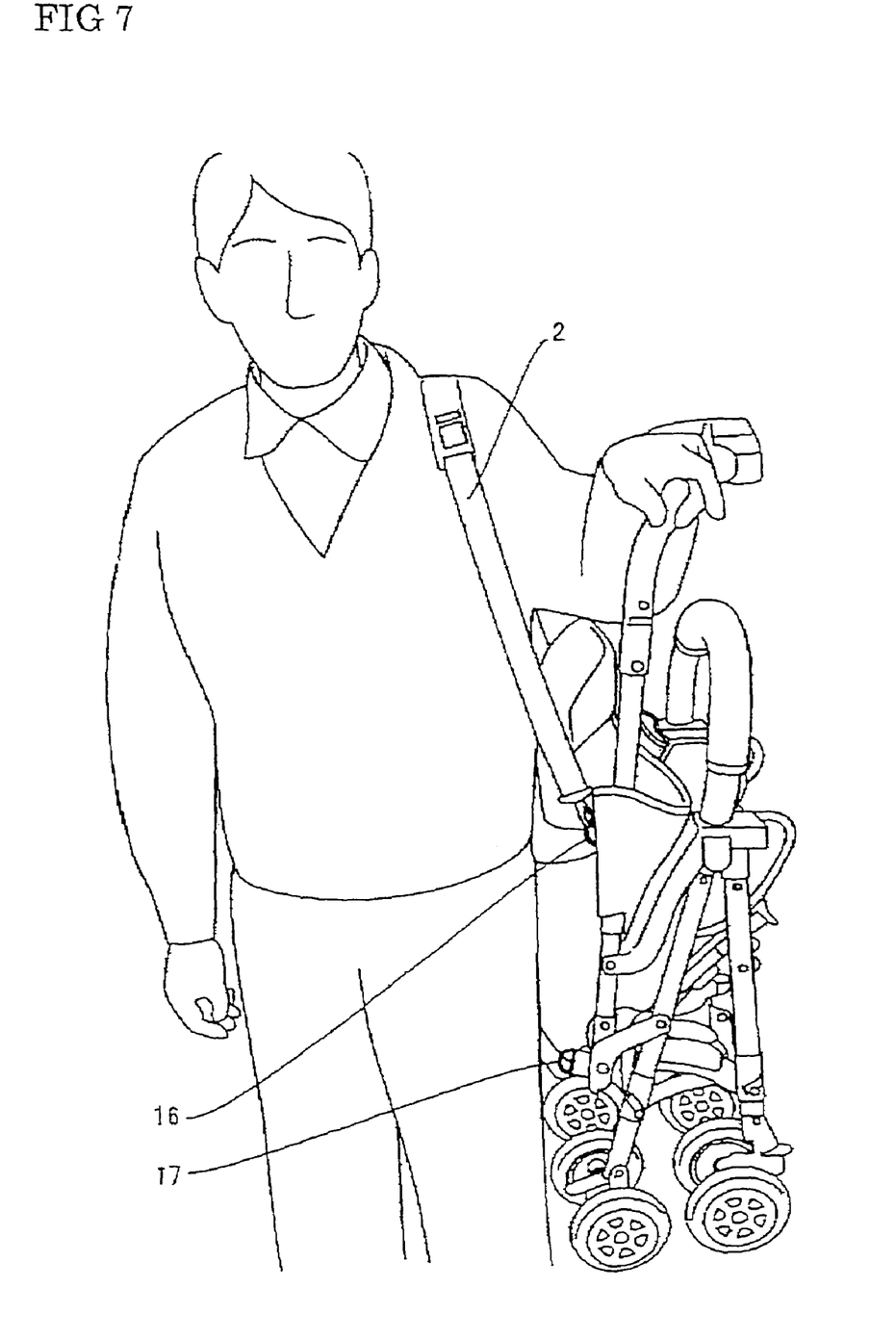
FIG. 7 is a view showing a folded baby carriage which is longitudinally held.
Figure 9:
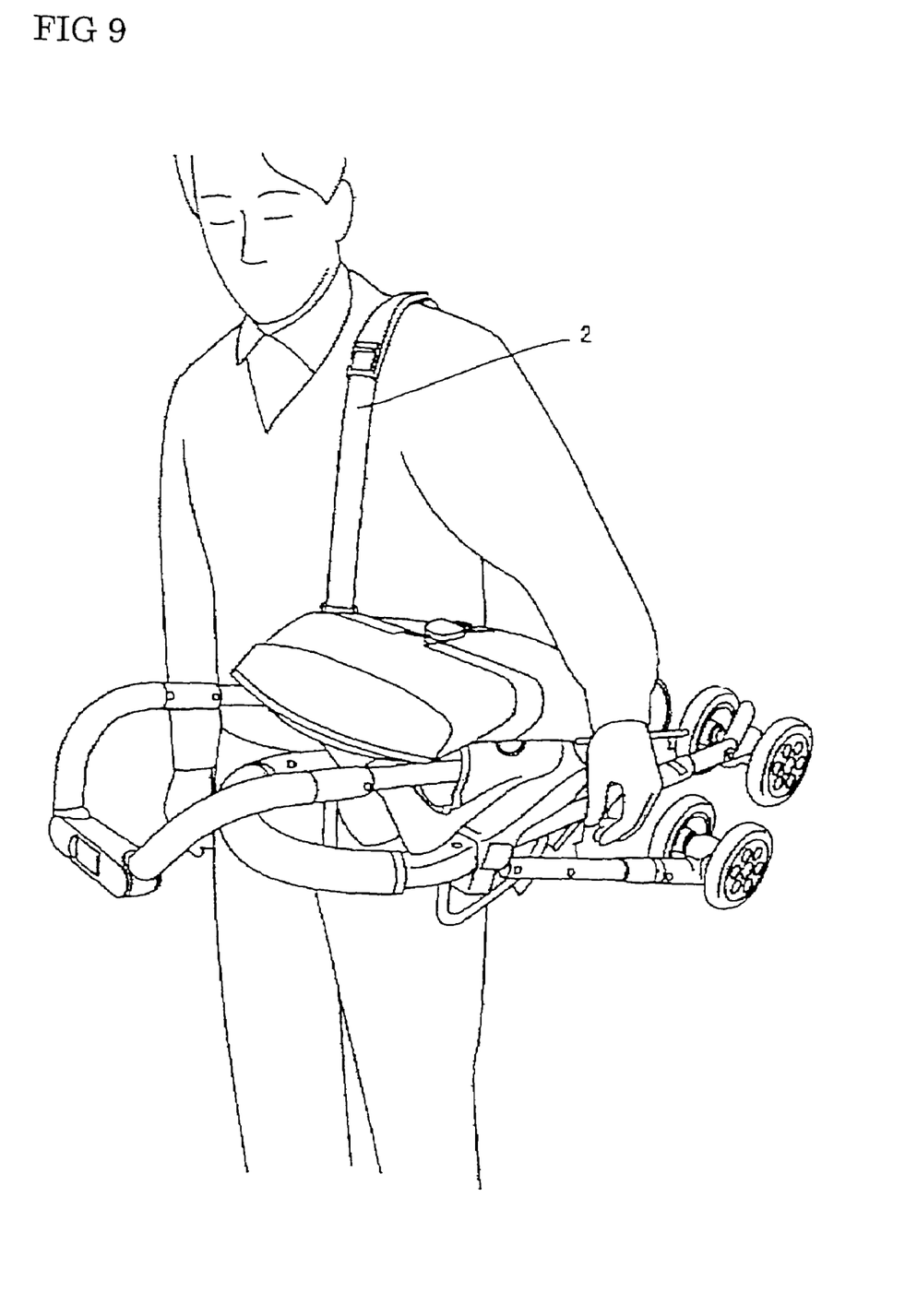
FIG. 9 is a view showing the folded baby carriage which is laterally held.

As shown in FIGS. 7 and 9, the baby carriage can be easily carried when the baby carriage 1 in the folded state is held by a suspension belt 2 on a shoulder. In this case, it is convenient when the form of holding the baby carriage longitudinally shown in FIG. 7 and the form of holding the baby carriage laterally as shown in FIG. 9 can be appropriately selected. Furthermore, it is also convenient when the baby carriage can be held on either right or left shoulder.

In order to implement the above, the baby carriage comprises the suspension belt 2 and four belt connection points for connecting ends of the suspension belt 2. It is preferable that the belt connection points are provided right and left positions in an upper region and right and left positions in a lower region across the center of gravity of the baby carriage in the folded state in order to balance the weight. In addition, although the suspension belt 2 may be connected to the baby carriage all the time, the belt connection points are preferably provided on the back surface side of the baby carriage so that the suspension belt 2 may not get in the way of the child seated in the seat.

Figure 6:
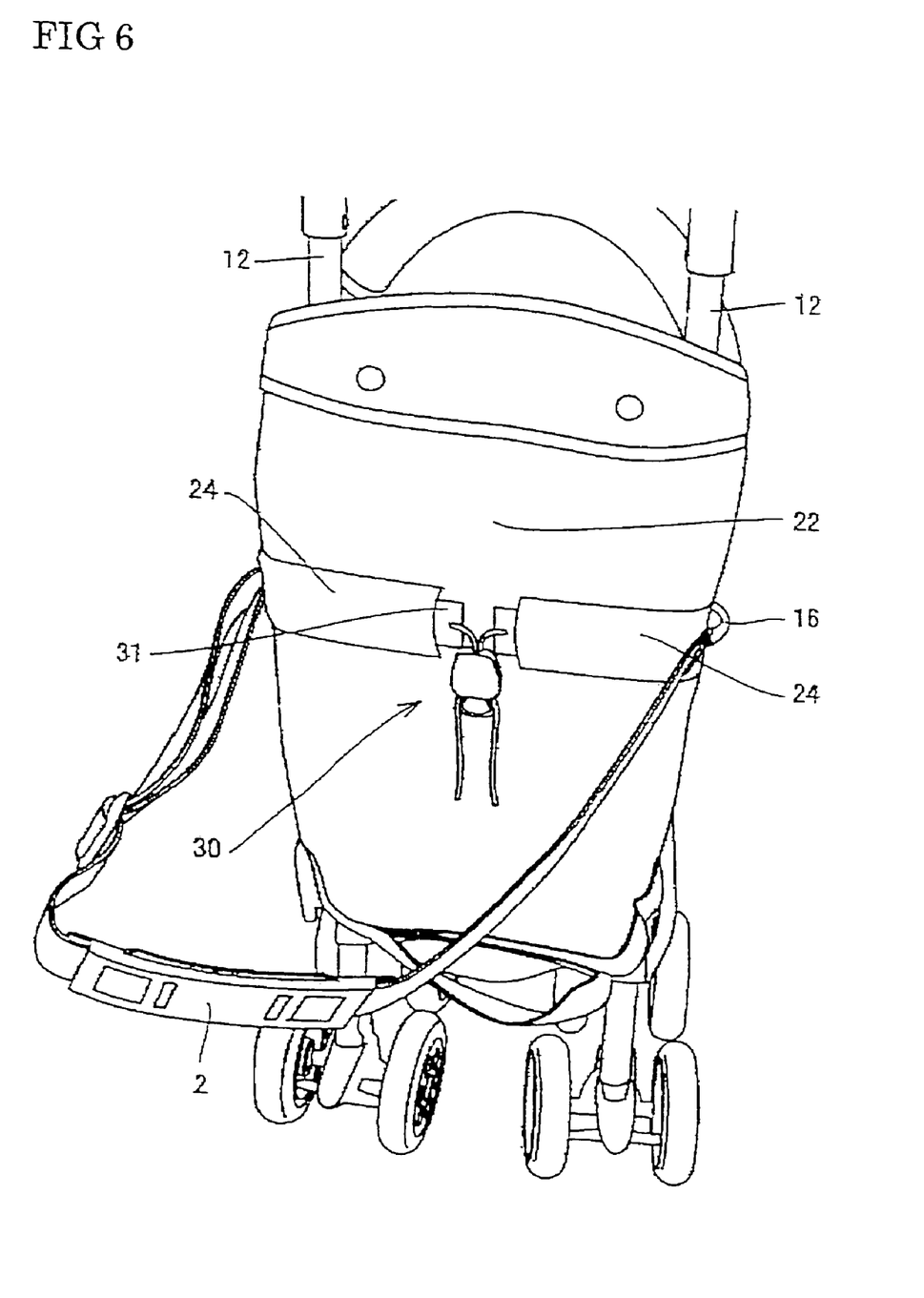
FIG. 6 is a view showing a state in which both ends of a suspension belt are connected to upper belt connection points.

According to the illustrated embodiment, as shown in FIGS. 6 and 13, as the upper belt connection points, set rings 16 are mounted on the pair of side vertical frame members 12. In those drawings, although only one set ring 16 is shown, the same set ring is mounted on the other side at the same position. The suspension belt 2 has hooks having the well-known structure, on both ends. As shown in FIG. 6, when the suspension belt 2 is connected to the upper two belt connection points, the folded baby carriage can be longitudinally held as shown in FIG. 7.

Figure 8:
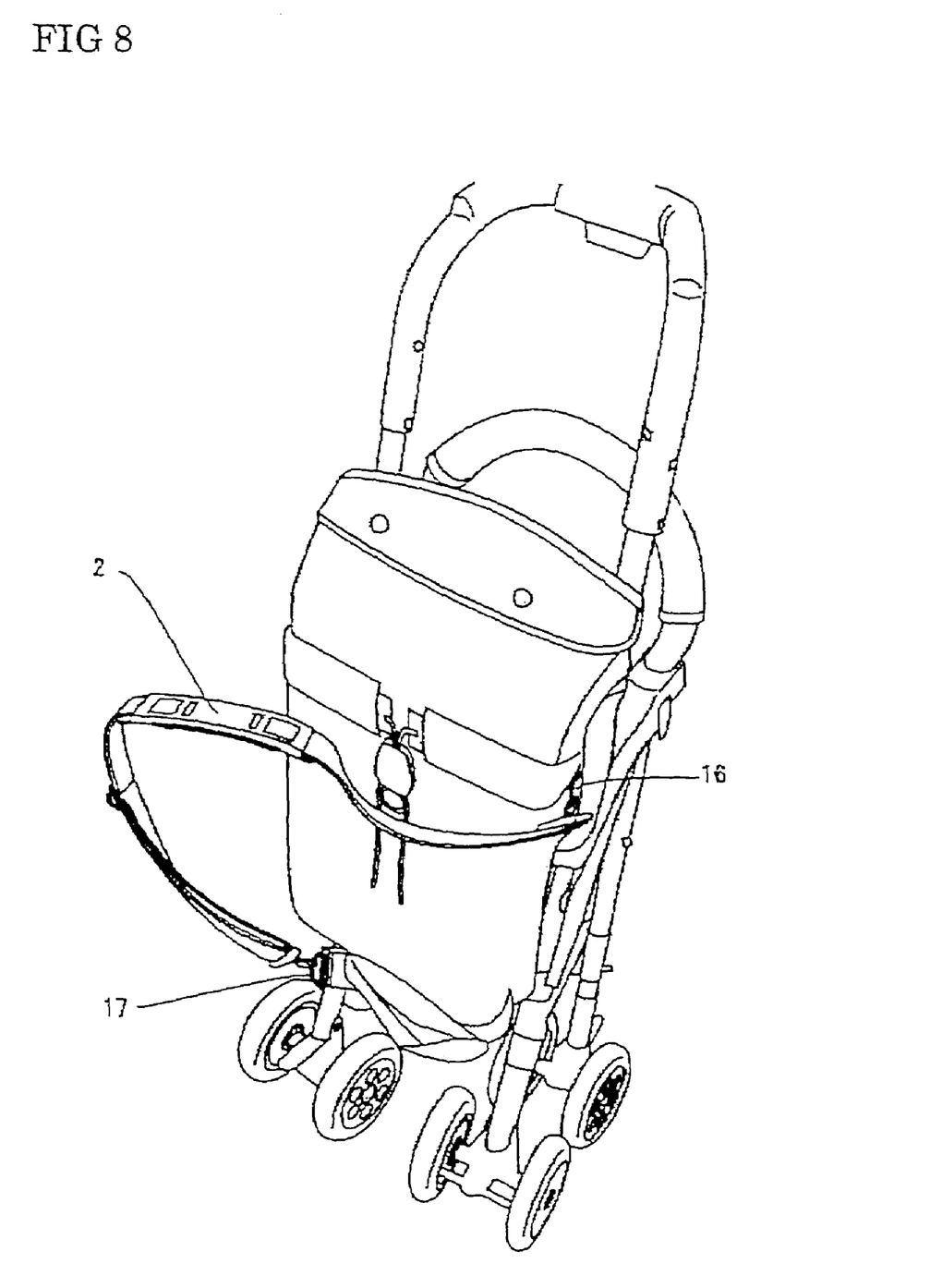
FIG. 8 is a view showing a state in which one end of the suspension belt is connected to the upper belt connection point and the other end thereof is connected to a lower belt connection point.

As the lower belt connection points, according to the illustrated embodiment, a set ring 17 is mounted on the rear end of the member supporting the seating surface and the same set ring 17 is provided on the other side (not shown). As shown in FIG. 8, when the suspension belt 2 is connected to the right upper set ring 16 and the left lower set ring 17, the folded baby carriage can be laterally held as shown in FIG. 9.

Although one embodiment of the present invention was described in detail with reference to the drawings, they are illustrative and various kinds of modifications and variations can be made. Some of them are listed and described hereinafter.

(1) Although the back surface support includes the back surface string member extending over the whole length of the back surface of the backrest sheet part in the width direction and having both ends connected to the pair of side vertical frame members in the illustrated embodiment, the well-known reclining mechanism may be used instead of the back surface string member.

(2) According to the illustrated embodiment, three notches are provided in order to connect the seating surface core and the back surface core so as to be smoothly curved. However, the number of the notches is not limited and may be only one. Alternatively, any structure can be employed as long as the seating surface core and the back surface core can be connected to be bent instead of the notch.

(3) According to the illustrated embodiment, the back surface core has a width dimension ranging over the whole width of the backrest sheet part in the width direction. However, it may. alternatively have a width dimension different from that of the backrest sheet part.

(4) Although the cushion member is arranged on the core in order to provide a soft touch for the child in the illustrated embodiment, the cushion is not always provided.

INDUSTRIAL APPLICABILITY

The present invention can be advantageously used in a baby carriage having a core in each of a seat part and a backrest part of a seat hammock.

The invention claimed is:

1. A baby carriage that is foldable from an open state to a folded state so as to be reduced in a width dimension of the baby carriage in a width direction, comprising:
   a body frame including a seating surface supporting member, and a pair of side upright frame members extending to rise upward respectively from two sides of a rear end region of said seating surface supporting member;
   a seat hammock including seating surface sheet part extending over said seating surface supporting member, and a backrest sheet part connected to a rear edge of said seating surface sheet part and extending between said pair of side upright frame members, and
   a core arranged inside said seat hammock and continuously extending from said seating surface sheet part to said backrest sheet part, wherein said core comprises a single flat plate that continuously includes a seating surface core arranged inside said seating surface sheet part, a back surface core arranged inside said backrest sheet part, and at least one concave portion respectively forming a bending point of said flat plate between said back surface core and said seating surface core,
   wherein said back surface core extends in said width direction over a whole width of said backrest sheet part inside said backrest sheet part of said seat hammock,
   wherein said back surface core is not bent in said width direction when said baby carriage is in said folded state,
   wherein a width dimension of said back surface core is larger than a distance between the pair of side upright frame members in said folded state of the baby carriage, and
   wherein said backrest sheet part including said back surface core therein is positioned behind the pair of side upright frame members in said folded state of the baby carriage.

2. The baby carriage according to claim 1, wherein said concave portion is a notch formed in a back surface of said flat plate.

3. The baby carriage according to claim 1, wherein said at least one concave portion includes plural concave portions respectively forming plural bending points that are provided at a plurality of positions at intervals in a longitudinal direction of the core in order to connect said seating surface core and said back surface core to be smoothly curved when said core is bent at said bending points.

4. The baby carriage according to claim 1,
   wherein said flat plate is a hard resin plate and said core further comprises a cushion attached on said hard resin plate, and
   wherein a hinge bendably connecting said seating surface core and said back surface core is formed by a thinned part of said resin plate constituting said concave portion.

5. The baby carriage according to claim 1, wherein said core further includes a head part core connected to an upper edge of said back surface core.

6. The baby carriage according to claim 5, wherein said head part core is connected to said back surface core by a bendable connection so as to be bendable at said bendable connection.

7. The baby carriage according to claim 5, wherein said single flat plate continuously includes said head part core bendably connected to said upper edge of said back surface core.

8. The baby carriage according to claim 1, wherein said back surface core has a tapered configuration in which a width of said back surface core is increased toward an upper side of said back surface core.

* * * * *